United States Patent
Lo et al.

(10) Patent No.: US 7,867,942 B2
(45) Date of Patent: Jan. 11, 2011

(54) HIGHLY DISPERSED CARBON SUPPORTED METAL CATALYST AND METHOD FOR MANUFACTURING THE SAME

(75) Inventors: Man-Yin Lo, Hsinchu (TW); Hsi-Yen Hsu, Taipei (TW); Yan Zhi Chen, Changhua County (TW); Li Duan Tsai, Hsinchu (TW); Yu Min Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 358 days.

(21) Appl. No.: 12/060,319

(22) Filed: Apr. 1, 2008

(65) Prior Publication Data

US 2009/0131247 A1    May 21, 2009

(30) Foreign Application Priority Data

Nov. 19, 2007  (TW) .............................. 96143669 A

(51) Int. Cl.
- *B01J 21/18* (2006.01)
- *B01J 23/00* (2006.01)
- *B01J 23/40* (2006.01)
- *B01J 23/74* (2006.01)
- *H01M 4/02* (2006.01)
- *H01M 4/36* (2006.01)
- *H01M 4/92* (2006.01)
- *H01M 4/94* (2006.01)

(52) U.S. Cl. .................. 502/185; 502/180; 502/182; 429/523; 429/524; 429/525; 429/526; 429/527; 429/528

(58) Field of Classification Search ................. 502/180, 502/182, 185; 429/523–528
See application file for complete search history.

(56) References Cited

U.S. PATENT DOCUMENTS

| | | | | |
|---|---|---|---|---|
| 6,066,410 A | * | 5/2000 | Auer et al. | 429/40 |
| 6,670,301 B2 | * | 12/2003 | Adzic et al. | 502/185 |
| 7,205,255 B2 | * | 4/2007 | Yamamoto | 502/101 |
| 7,345,005 B2 | * | 3/2008 | Kourtakis | 502/182 |

* cited by examiner

*Primary Examiner*—Patricia L Hailey
(74) *Attorney, Agent, or Firm*—Thomas, Kayden, Horstemeyer & Risley

(57) ABSTRACT

The invention provides a method for manufacturing a highly dispersed carbon supported metal catalyst, including charging a carbon support and a dispersing agent in water. The carbon support is evenly dispersed in water with an average diameter of 10 nm to 2000 nm and a specific surface area of 50 $m^2/g$ to 1500 $m^2/g$. A metal salt of Pd, Pt, or combinations thereof is formed on the carbon support surface and then reduced to a valance state less than (IV).

12 Claims, No Drawings

HIGHLY DISPERSED CARBON SUPPORTED METAL CATALYST AND METHOD FOR MANUFACTURING THE SAME

BACKGROUND OF THE INVENTION

1. Field of the Invention

The present invention relates to a metal catalyst, and in particular relates to a highly dispersed metal catalyst and method for manufacturing the same.

2. Description of the Related Art

For a fuel cell, the critical technology is the catalyst for transforming chemical energy to electrical energy. Generally, the catalyst is platinum. For achieving sufficient current density, high content platinum is necessary, thereby increasing cost of production. Alternatively, the platinum may be supported on an active carbon with high surface area to achieve better utilization ratio. Presently, the supported platinum catalyst is synthesized as follows: first, the carbon support is modified; second, the platinum metal precursor is reduced by a reductant; and third, the platinum metal is deposited on the modified carbon support. Because the carbon support is easily aggregated, the surface between the aggregated carbon support cannot be utilized, such that the platinum metal is not evenly dispersed and aggregated. Therefore, a highly loaded and evenly dispersed platinum catalyst is difficult to achieve employing aggregated carbon supports. In manufacturing membrane electrode assemblies (MEA), the catalyst should be prepared as slurry prior to MEA fabrication. Even if the carbon support is modified, the catalyst in the step of slurry preparation will aggregate to larger particles without well dispersion. Consequently, catalyst activity is reduced after forming the MEA.

Accordingly, a novel catalyst is called for, for solving the described problem such as aggregation of the support, e.g. carbon black.

BRIEF SUMMARY OF THE INVENTION

The invention provides a highly dispersed carbon supported metal catalyst, comprising a dispersing agent, a carbon support evenly dispersed in water by the dispersing agent, and the carbon support having a particle size of 10 nm to 2000 nm, and a metal formed on the carbon support surface, wherein the metal is Pd, Pt, or combinations thereof with a valence state less than (IV).

The invention also provides a method for forming a highly dispersed carbon supported metal catalyst, comprising charging a carbon support and a dispersing agent in water, wherein the carbon support is evenly dispersed in water by the dispersing agent, and the carbon support has a particle size of 10 nm to 2000 nm, forming a metal salt on the carbon support surface, and the metal salt is Pd salt, Pt salt, or combinations thereof, and reducing the metal salt to a valence state less than (IV).

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Many catalysts possess high activity in original tests however fail to maintain the corresponding activity after forming an MEA. The reason is due to the fact that an unevenly dispersed catalyst in slurry will aggregate, such that the active sites of the catalyst surface cover each other and reduce their utilization ratio.

For solving the described problem, the invention provides a method for forming a highly dispersed carbon supported metal catalyst, comprising charging a carbon support and a dispersing agent in water, wherein the carbon support is evenly dispersed in water by the dispersing agent, and the carbon support has a particle size of 10 nm to 2000 nm, forming a metal salt on the carbon support surface, and the metal salt is Pd salt, Pt salt, or combinations thereof, and the metal salt is reduced to a valence state less than (IV).

In one embodiment, the suitable carbon support has a specific surface area of about 10 $m^2$/g to 2000 $m^2$/g, and preferably of about 50 $m^2$/g to 1500 $m^2$/g. The carbon support can be carbon nano tube, carbon nano fiber, or combinations thereof.

The described dispersing agent includes cationic surfactant, anionic surfactant, nonionic surfactant, zwitterionic surfactant, or combinations thereof.

The suitable anionic surfactant can be sodium salt, magnesium salt, or ammonium salt of alkyl sulphates, alkyl ether sulphates, alkaryl sulphonates, alkanoyl isethionates, alkyl succinates, alkyl sulphosuccinates, N-alkoxyl sarcosinates, alkyl phosphates, alkyl ether phosphates, alkyl ether carboxylates or alpha-olefin sulphonates.

The suitable nonionic surfactant can be aliphatic ($C_{8-18}$) primary or secondary linear or branched alcohol or phenol accompanied with alkylene oxide. In one embodiment, the alkylene oxide is composed of 6 to 30 ethylene oxides. Other nonionic surfactant is alkanolamides substituted by one or two alkyl groups, such as coco ethanolamide, coco di-ethanolamide, coco isopropanolamide, or the likes.

The described zwitterionic surfactant can be alkyl amine oxides, alkyl betaines, alkyl amidopropyl betaines, alkyl sulphobetaines, alkyl sulphobetaines, alkyl glycinates, alkyl carboxyglycinates, alkyl amphopropionates, alkyl amphoglycinates, alkyl amidopropyl hydroxysultainates, acyl taurates, or acyl glutamates. The described alkyl can be $C_{8-19}$ alkyl group. For example, the zwitterionic surfactant also includes lauryl amine oxide, cocodimethyl sulphopropyl betaine, lauryl betaine, cocamidopropyl betaine, or sodium cocamphopropionate.

In one embodiment, the dispersing agent (surfactant) and carbon support were charged in water and then milled to obtain a highly dispersed carbon support.

Next, a metal salt was formed on the carbon support surface by impregnation, incipient wetness, deposition precipitation, or chemical vapor deposition. The metal salt is halide, nitrite, ammonium, or combinations thereof of, such as Pd salt, Pt salt, or combinations thereof. In addition, the metal salt may further include Ru salt, Sn salt, Mo salt, Co salt, Fe salt, Cr salt, Pb salt, Nb salt, Ta salt, Mn salt, Cu salt, Ni salt, or combinations thereof. Therefore, the deactivation of the active sites on the surface of Pt salt, Pd salt, and combinations thereof will be delayed, thereby enhancing the anti-poisoning ability of the catalyst.

At last, metal salt was reduced to a valence state less than (IV) to complete a highly dispersed metal catalyst. If Ru salt, Sn salt, Mo salt, Co salt, Fe salt, Cr salt, Pb salt, Nb salt, Ta salt, Mn salt, Cu salt, Ni salt, or combinations thereof is adapted, the reduced metal adhered on the carbon support surface will not only be Pt or Pt but also Ru, Sn, Mo, and the likes.

Because the metal catalyst of the invention has well dispersion in slurry, it is applicable to the MEA in fuel cells such as proton exchange membrane fuel cells (PEFC) or direct methanol fuel cells (DMFC).

COMPARATIVE EXAMPLE AND EXAMPLES

Comparative Example 1

10 g of carbon black (ECP300) and 4 L of zirconia balls with diameter of 1 mm were charged in water. After milling in 400 revolution per minute (herein after rpm), the zirconia balls were removed by centriguation and a carbon support slurry was obtained. The described carbon support had a BET specific surface area of about 700 m$^2$/g and an average diameter greater than 6000 nm.

Example 1

10 g of carbon black (ECP300), 10 g of dispersing agent (TritonX 100, commercial available from Aldrich), and 4 L of zirconia balls with diameter of 1 mm were charged in water. After milling in 400 rpm, the zirconia balls were removed by centrifugation and a highly dispersed carbon support slurry was obtained. The described carbon support had a BET specific surface area of about 700 m$^2$/g and an average diameter of about 43 nm. Compared to the carbon support diameter (>6000 nm) in Comparative Example 1, the diameter of the carbon support was effectively reduced by the dispersing agent.

Example 2

10 g of carbon black (ECP300), 10 g of dispersing agent (TritonX 405, commercial available from Aldrich), and 4 L of zirconia balls with diameter of 1 mm were charged in water. After milling in 400 rpm, the zirconia balls were removed by centrifugation and a highly dispersed carbon support slurry was obtained. The described carbon support had a BET specific surface area of about 700 m$^2$/g and an average diameter of about 78 nm. Compared to the carbon support diameter (>6000 nm) in Comparative Example 1, the diameter of the carbon support was effectively reduced by the dispersing agent.

Example 3

10 g of carbon black (BP2000), 10 g of dispersing agent (TritonX 100, commercial available from Aldrich), and 4 L of zirconia balls with diameter of 1 mm were charged in water. After milling in 400 round per minute (herein after rpm), the zirconia balls were removed by centrifugation and a highly dispersed carbon support slurry was obtained. The described carbon support had a BET specific surface area of about 1000 m$^2$/g and an average diameter of about 115 nm. Compared to the carbon support diameter (>6000 nm) in Comparative Example 1, the diameter of the carbon support was effectively reduced by the dispersing agent.

Commercial Available Product Tanaka

Tanaka has a Pt loading percentage of 66.3% and a current density of 15 mA/mg Pt.

Example 4

6 g of highly dispersed carbon support in Example 1 was charged in water, 0.7899 g of Pt metal salt $H_2PtCl_6$ was then added, and 11.35 g of methanol (reductant) was added to reduce the Pt metal salt for forming a highly dispersed metal catalyst. The described metal catalyst had a Pt loading percentage of 67% and a current density of 17.03 mA/mg Pt. Compared to the commercial available product Tanaka, the metal catalyst of this example had higher Pt loading percentage and higher current density per unit weight of platinum. Accordingly, the invention may utilize the platinum more effectively, thereby reducing the cost of production.

Example 5

30.4 g of highly dispersed carbon support in Example 1 was charged in water, 0.8425 g of Pt metal salt $H_2PtCl_6$ was then added, and 50 g of ethylene glycol (reductant) was added to reduce the Pt metal salt for forming a highly dispersed metal catalyst. The described metal catalyst had a Pt loading percentage of 76% and a current density of 20.14 mA/mg Pt. Compared to the commercial available product Tanaka, the metal catalyst of this example had higher Pt loading percentage and higher current density per unit weight of platinum. Accordingly, the invention may utilize the platinum more effectively, thereby reducing the cost of production.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A highly dispersed carbon supported metal catalyst, comprising:
    a dispersing agent;
    a carbon support evenly dispersed in water by the dispersing agent, and the carbon support having a particle size of 10 nm to 2000 nm; and
    a metal formed on the carbon support surface;
    wherein the metal is Pd, Pt, or combinations thereof with a valence state less than (IV).

2. The catalyst as claimed in claim 1, wherein the carbon support has a specific surface area of 50 m$^2$/g to 1500 m$^2$/g.

3. The catalyst as claimed in claim 1, wherein the carbon support comprises active carbon, carbon black, carbon nano tube, carbon nano fiber, or combinations thereof.

4. The catalyst as claimed in claim 1, wherein the dispersing agent comprises cationic surfactant, anionic surfactant, nonionic surfactant, zwitterionic surfactant, or combinations thereof.

5. The catalyst as claimed in claim 1, wherein the metal further comprises Ru, Sn, Mo, Co, Fe, Cr, Pb, Nb, Ta, Mn, Cu, Ni, or combinations thereof.

6. A method for forming a highly dispersed carbon supported metal catalyst, comprising:
    charging a carbon support and a dispersing agent in water, wherein the carbon support is evenly dispersed in water by the dispersing agent and the carbon support has a particle size of 10 nm to 2000 nm;
    forming a metal salt on the carbon support surface, and the metal salt is Pd salt, Pt salt, or combinations thereof; and
    reducing the metal salt to a valence state less than (IV).

7. The method as claimed in claim 6, wherein the carbon support has a specific surface area of 50 m$^2$/g to 1500 m$^2$/g.

8. The method as claimed in claim 6, wherein the carbon support comprises active carbon, carbon black, carbon nano tube, carbon nano fiber, or combinations thereof.

9. The method as claimed in claim 6, wherein the dispersing agent comprises cationic surfactant, anionic surfactant, nonionic surfactant, zwitterionic surfactant, or combinations thereof.

10. The method as claimed in claim 6, wherein the step of forming the metal salt on the carbon support surface comprises impregnation, incipient wetness impregnation, deposition precipitation, or chemical vapor deposition.

11. The method as claimed in claim 6, wherein the metal salt comprises halide, nitrite, ammonium, or combinations thereof.

12. The method as claimed in claim 6, wherein the metal salt further comprises Ru salt, Sn salt, Mo salt, Co salt, Fe salt, Cr salt, Pb salt, Nb salt, Ta salt, Mn salt, Cu salt, Ni salt, or combinations thereof.

* * * * *